Nov. 2, 1943. A. L. PARKER 2,333,120
ASSEMBLING TOOL
Filed Aug. 15, 1940
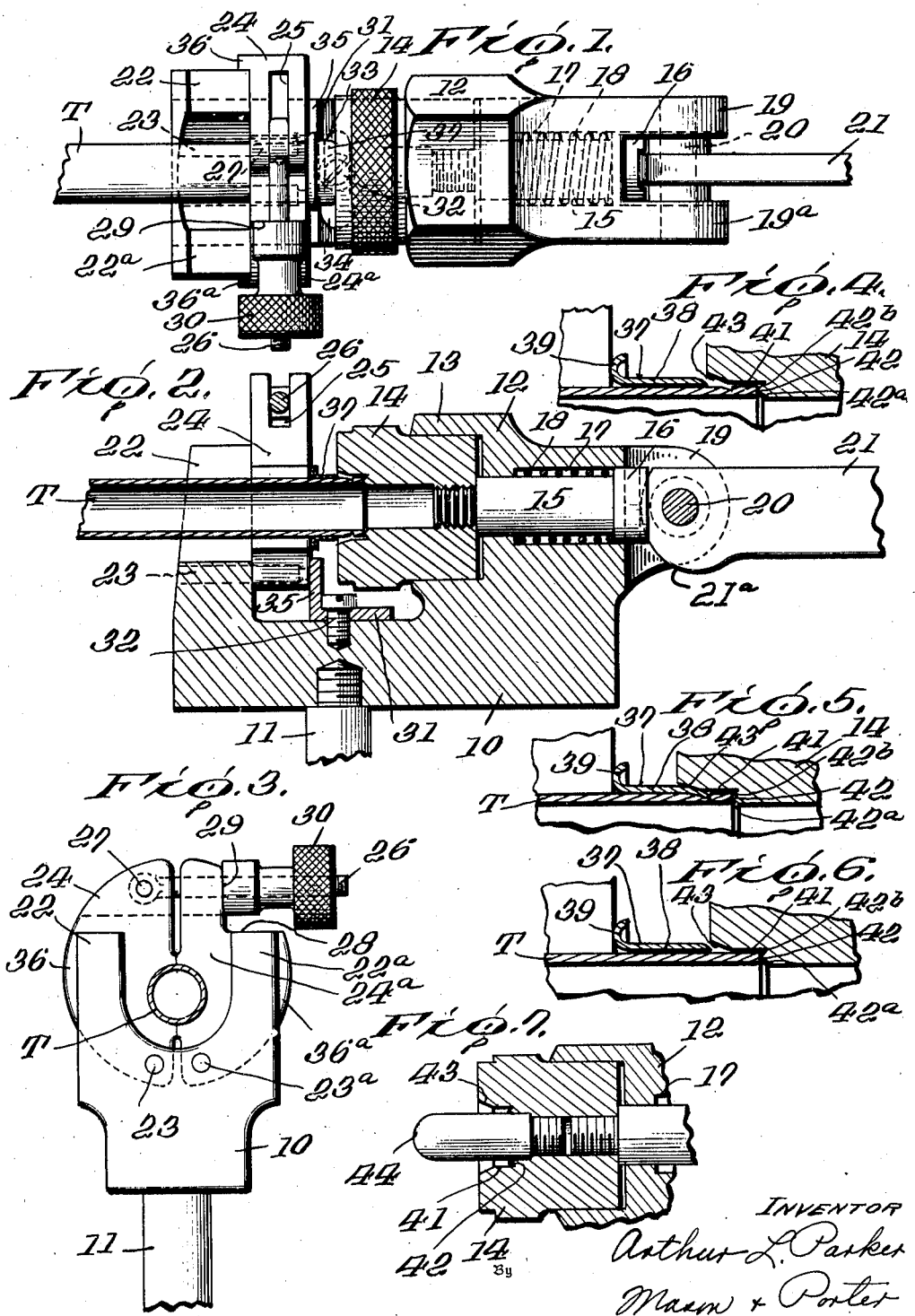

Patented Nov. 2, 1943

2,333,120

UNITED STATES PATENT OFFICE 2,333,120

ASSEMBLING TOOL

Arthur L. Parker, Cleveland, Ohio

Application August 15, 1940, Serial No. 352,788

2 Claims. (Cl. 29—84)

The present invention relates to new and useful improvements in an assembling tool, and more particularly to improvements in a tool for applying a ferrule or holding sleeve to a tube.

The invention is particularly concerned with the assembling of tubes and ferrules of the type shown in my co-pending applications, Serial No. 262,965, filed March 20, 1939, issued Aug. 5, 1941, as Patent No. 2,251,716, and Serial No. 264,812, filed March 29, 1939, issued Aug. 5, 1941, as Patent No. 2,251,717. In this type of tube coupling, the ferrule or holding sleeve includes a sleeve portion and an outward shoulder at one end of the sleeve portion. The outward shoulder cooperates with one of the coupling members and the opposite end of the sleeve portion of the ferrule is forced into engagement with the tube by the other coupling member. The coupling members thus cooperate with the ferrules to tightly clamp the tube. In the first application mentioned above, tightening of the coupling members relative to one another causes one end of the ferrule to cut into the outer surface of the tube so as to provide tight gripping engagement therewith. In the second application mentioned above, the tube is provided with a preformed peripheral groove into which one end of the ferrule is forced when the coupling members are tightened relative to one another.

An object of the present invention is to provide a relatively simple and easily operated tool for applying a ferrule or holding sleeve to a tube substantially of the type pointed out above.

Another object of the invention is to provide a tool of the above type wherein the tube with the ferrule loosely applied thereto is properly positioned in the path of a movable die member which effects the desired gripping engagement between the ferrule and the tube.

A further object of the invention is to provide a tool of the above type wherein the positioning means for the tube is removable so as to permit use of the tool with various tube sizes.

A still further object of the invention is to provide a tool of the above type wherein a shift collet is employed for positioning the tube and wherein this collet and the movable die member are replaceable in pairs for various sizes of tubes.

The above and other objects of the invention will in part be obvious and will be hereinafter more fully pointed out.

In the accompanying drawing:

Figure 1 is a top plan view of the tool with a tube and ferrule positioned therein before clamping movement of the die member.

Figure 2 is a side view, in section, of the tool assembly shown in Figure 1.

Figure 3 is an end view of Figure 1, showing the collet.

Figure 4 is an enlarged fragmentary sectional view showing the position of the tube having a preformed groove, and a ferrule before the ferrule is forced into engagement with the tube by the die member.

Figure 5 is a view, similar to Figure 4, but showing the position of the die member after the adjacent end of the ferrule has been forced into engagement with the preformed groove in the tube.

Figure 6 is a view, similar to Figure 4, but showing the application of a ferrule to a tube without any preformed groove before the ferrule is caused to engage the surface of the tube by movement of the die memember.

Figure 7 is a fragmentary detail sectional view of a modified form of die member wherein a central mandrel is employed for preventing collapsing of the tube during application of the ferrule.

Referring more in detail to the accompanying drawing, and particularly in Figures 1, 2, and 3, the tool is illustrated as including a body portion 10 which may be supported on any suitable form of standard 11. At one end of the body portion 10 of the tool, there is provided an upstanding end portion 12 which is provided with a horizontal recessed portion 13 within which a die member 14 is mounted for sliding movement.

The die member is threadedly secured to a spindle 15 which extends through the end portion 12 and is provided with an enlarged head portion 16 normally disposed outside of the end of the body portion 10, as shown in Figures 1 and 2. The end 12 of the body portion 10 is provided with a recess 17 surrounding the spindle 15 and in which a coil spring 18 is mounted. The coil spring has one end thereof bearing against the body portion and has the opposite end thereof bearing against the enlarged head portion 16 for normally maintaining the spindle and die 14 in the retracted position shown in Figures 1 and 2. The body portion 10 is provided with a pair of spaced rearwardly extending lugs, 19, 19a which are apertured to receive a pin 20 on which a lever 21 is mounted. The lever 21 is provided with a cam surface 21a which is adapted to engage the enlarged head 16 on the spindle 15 to force the spindle and the die member inwardly when the handle is moved downwardly.

At the opposite end of the body portion 10 and spaced from the end 12, there are provided a pair of upstanding arms 22, 22a, which provide a U-shaped opening between the opposing surfaces thereof. A pair of horizontally spaced pins 23, 23a are mounted on the arms 22, 22a, respectively, and extend inwardly toward the opposite end of the body portion A collet including a pair of members 24, 24a, are mounted on the pins 23, 23a, respectively, for pivotal movement within the upstanding ends of the body portion. Each part of the collet is shaped to provide a semi-circular recess between which a tube T is adapted to be clamped.

The collet member 24 is provided with a vertical recess 25 extending substantially at right angles to the axis of the tube T and in which a threaded pin 26 is pivotally mounted, as at 27. The collet member 24a is provided with a similar recess opposed to the recess 25 and into which the threaded pin 26 can be moved. The collet member 24a is cut away, as at 28 to provide a substantially vertical surface 29 against which a set screw 30 is adapted to abut for clamping the members 24, 24a together. The set screw threadedly engages the pin 26 and can be loosened to permit separation of the members 24, 24a.

Beneath the die member 14, a plate 31 is mounted by means of a screw 32 or the like. The plate is provided with a slot 33 having an enlarged opening 34 at one end thereof. The screw 32 extends through the slot and serves to maintain the plate 31 in position. Upon loosening of the screw 32, the plate can be shifted so that it can be removed by permitting passage of the screw head through the enlarged opening 34.

The plate 31 is provided with an upstanding edge portion 35 which extends across the body portion and abuts against the inner surface of the collet members 24, 24a so to maintain the collet members abutting against the inner surfaces of the arms 22, 22a. The collet members 24, 24a are also provided with shoulder portions 36, 36a which are adapted to abut against the outer surface of the arms 22, 22a, respectively. The purpose of this construction is to maintain the collet members in proper position with respect to the die member 14 so that the tube T will be maintained in exact alignment with the operating surface of the die member 14.

A ferrule 37, as particularly shown in Figure 4, is provided with a cylindrical sleeve portion 38 which surrounds the tube T. The sleeve portion 38 is provided with an outwardly extending shoulder 39 at one end thereof and this outwardly extending shoulder is placed against the inner surfaces of the collet members 24, 24a. As shown in Figure 4, the tube T is provided with a peripheral groove 40 and the tube may be positioned so that the opposite end of the sleeve portion 38 of the ferrule is disposed immediately above the grove 40 or spaced inwardly thereof, as shown. The die member 14 is provided with an annular recessed portion or bore 41 which is adapted to pass over the end of the tube extending beyond the groove 40 therein.

The tube is clamped within the collet members for axial movement relative thereto. The recess or bore is restricted inwardly of the entrance thereof to present a shoulder 42. This shoulder is formed with oppositely inclined inner and outer surfaces 42a, 42b, respectively, so that the pointed edge of the shoulder is adapted to engage the end of the tube and force the same axially of the collet to exactly position the adjacent end of the ferrule above the groove 40 in the tube. At the entrance of the recess or bore 41, the die member is shaped to provide an internal camming surface 43 which engages the free end of the ferrule and serves to force this end of the ferrule into the groove 40 during movement of the die member, as shown in Figure 5. The camming surface 43 and the recess or bore 41 on the die member 14 are dimensioned so that the camming surface 43 will begin to force the free edge of the ferrule into the groove 40 in the tube as the groove 40 is positioned beneath the end of the ferrule. To effect this clamping movement of the die member, as pointed out above, the lever 21 is forced downwardly above the pivot pin 20 so that the cam surface 21a engages the enlarged end 16 of the spindle 15. Upon reverse movement of the lever 11, the spring 18 will tend to force the spindle and die member 14 to the retracted position shown in Figure 2. The clamping screw 30 can be released so as to permit the collet members 24, 24a to be pivotally separated about the pins 23, 23a, respectively. Thus the tube T with the ferrule clamped thereon can be bodily removed.

In the form of the invention shown in Figure 6, the tube does not have any preformed groove therein. In this form of the invention, inward movement of the die member 14 will cause the cam surface 43 thereon to engage the free end of the ferrule so as to cause this end of the ferrule to bite into the surface of the tube and slight inward movement of the tube is effected by the shoulder 42 on the die member. According to Figure 7 of the drawing, the die member 14 may be provided with a central mandrel 44 which is threadably secured to the die member. The mandrel 44 is adapted to extend within the tube and may be employed to prevent any inward collapsing of the tube during clamping of the ferrule thereon.

When the proper size of die member and collet are mounted on the supporting structure 10, the clamping members 24, 24a are moved outwardly about the pivot pins 23, 23a, respectively, so that the tube can be inserted therebetween. The female coupling member is first placed over the tube and is disposed outside of the supporting structure 10. The ferrule is then applied to the inner end of the tube and the collet members 24, 24a are brought together and secured by the screw 30. The ferrule is preferably positioned with the shoulder 39 thereon abutting against the inner surface of the collet members. The tube is preferably positioned with the inner end thereof abutting against the shoulder 42 on the die member, although the tube may be positioned with the peripheral groove 40 immediately below the free end of the ferrule. The die member 14 is forced inwardly by downward movement of the handle 21 and when the end of the tube is initially positioned against the shoulder 42, this movement of the die member will cause similar axial movement of the tube so as to position the groove 40 properly with respect to the free end of the ferrule. Continued movement of the die member will bring the camming surface 43 into engagement with the adjacent end of the ferrule so as to force the same into the desired clamping engagement with the tube around the peripheral groove 40, as shown in Figure 5; or this continued movement of the die member and tube will cause the free end of the ferrule to bite into a tube which does not have any preformed groove thereon, as in Figure 6.

The particular conformation of the shoulder 42 is advantageous in that the narrow centrally located shoulder portion between the inclined surfaces 42a, 42b permits tubes of different wall thicknesses to be properly assembled with the ferrules. Thus, each tube can be positioned exactly the same distance from the camming shoulder 43 so long as some portion of the end of the tube abuts against the shoulder 43. The camming surface 43 is illustrated as being conical and while the surface thereof is illustrated as being substantially straight, it is to be clearly understood that this surface may have a convex or concave curvature. After the ferrule has been clamped on the tube, the end of the tube will have a slight indentation corresponding to the conformation of the shoulder 42 and the diameter of this indentation may exactly fit the seat in the coupling and thus assure a tight seating. As previously pointed out, the die member may carry a central mandrel 44 which passes within the tube and this mandrel serves to prevent the inner surface of the tube from being forced inwardly during clamping of the ferrule thereon.

It is to be clearly understood that various changes in the details of construction and arrangement of parts may be made without departing from the scope of the invention as set forth in the appended claims.

Having thus described the invention, I claim:

1. A tool for attaching a ferrule to the outer surface of a tube comprising a die member having a bore adapted to receive the end of the tube to which the ferrule is to be attached, said bore being restricted inwardly of the entrance thereof to present a shoulder with which the end of the tube engages and a camming surface at the entrance of the bore adapted to engage the ferrule placed on the tube, means for supporting the tube in alignment with said bore, an abutment means engaging the outer end of the ferrule, and means for moving the die toward the abutment means for causing ferrule and tube to move endwise relative to each other and for contracting the inner end of the ferrule into engagement with the tube.

2. A tool for attaching a ferrule to the outer surface of a tube comprising a die member having a bore adapted to receive the end of the tube to which the ferrule is to be attached, said die member having a shoulder adapted to engage the end of the tube, and a camming surface at the entrance of the bore adapted to engage the ferrule placed on the tube for contracting the inner end thereof when the ferrule is moved into the bore, a mandrel located in the bore and projecting beyond the outer end thereof and adapted to enter the tube and to contact therewith, an abutment means engaging the outer end of the ferrule, and means for moving the die and abutment means relative to each other for causing a relative movement of the ferrule and tube and for contracting the end of the ferrule into engagement with the tube.

ARTHUR L. PARKER.